US010154416B2

(12) United States Patent
Huang et al.

(10) Patent No.: US 10,154,416 B2
(45) Date of Patent: Dec. 11, 2018

(54) DATA PROCESSING METHOD, AND COMMUNICATIONS DEVICE AND SYSTEM

(71) Applicant: Huawei Technologies Co., Ltd., Shenzhen (CN)

(72) Inventors: Qufang Huang, Shanghai (CN); Wenji Liu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 51 days.

(21) Appl. No.: 15/223,395

(22) Filed: Jul. 29, 2016

(65) Prior Publication Data
US 2016/0337870 A1  Nov. 17, 2016

Related U.S. Application Data

(63) Continuation of application No. PCT/CN2014/071774, filed on Jan. 29, 2014.

(51) Int. Cl.
*H04W 28/02* (2009.01)
*H04W 16/14* (2009.01)
*H04L 1/18* (2006.01)
*H04L 1/20* (2006.01)

(52) U.S. Cl.
CPC .......... *H04W 16/14* (2013.01); *H04L 1/1861* (2013.01); *H04L 1/1887* (2013.01); *H04L 1/1893* (2013.01); *H04L 1/20* (2013.01); *H04W 28/0263* (2013.01)

(58) Field of Classification Search
CPC ................. H04W 28/0263; H04W 72/005
USPC ................................ 370/230–339
See application file for complete search history.

(56) References Cited

U.S. PATENT DOCUMENTS

| | | | |
|---|---|---|---|
| 2008/0320354 A1 | 12/2008 | Doppler et al. | |
| 2009/0209265 A1 | 8/2009 | Kwon et al. | |
| 2011/0194503 A1 | 8/2011 | Stanforth | |
| 2013/0343288 A1 | 12/2013 | Ratasuk et al. | |
| 2014/0341018 A1* | 11/2014 | Bhushan | H04W 28/0289 370/230 |
| 2015/0327115 A1* | 11/2015 | Park | H04W 28/06 370/328 |
| 2016/0066325 A1* | 3/2016 | Kim | H04W 72/1215 370/329 |
| 2016/0192433 A1* | 6/2016 | Deenoo | H04W 72/046 370/329 |

FOREIGN PATENT DOCUMENTS

| | | |
|---|---|---|
| CN | 101399649 A | 4/2009 |
| CN | 101516098 A | 8/2009 |
| CN | 101795457 A | 8/2010 |
| WO | 2008139319 A2 | 11/2008 |

* cited by examiner

*Primary Examiner* — Iqbal Zaidi
(74) *Attorney, Agent, or Firm* — Slater Matsil, LLP

(57) ABSTRACT

Embodiments disclose a data processing method, and a communications device and system. The method includes: transmitting, by a communications device, a data packet to a receiving node by using an unlicensed spectrum resource and by using a hybrid automatic repeat request process. The method also includes determining, by the communications device, that the unlicensed spectrum resource is unavailable and an unsuccessfully-sent data packet exists in the hybrid automatic repeat request process. The method also includes triggering, by the communications device, ARQ retransmission for the unsuccessfully-sent data packet.

17 Claims, 3 Drawing Sheets

DATA PROCESSING METHOD, AND COMMUNICATIONS DEVICE AND SYSTEM

CROSS-REFERENCE TO RELATED APPLICATIONS

This application claims the benefit of International filing No. PCT/CN2014/071774, filed on Jan. 29, 2014, which application is incorporated herein by reference.

TECHNICAL FIELD

Embodiments relate to the communications field, and in particular, to a data processing method, and a communications device and system.

BACKGROUND

In a current wireless network system, to avoid or reduce interference between different wireless technologies, a fixed spectrum allocation policy is widely used. Spectrum allocation is performed by a relevant national institution or a standard organization, to separately allocate a part of spectrums to specified institutions to perform particular services. A spectrum that is specified to be allocated is referred to as a licensed spectrum, and a spectrum that is not specified to be allocated is referred to as an unlicensed spectrum. A communications device may communicate with a peer device by using the licensed spectrum and the unlicensed spectrum. Usually, the licensed spectrum is stable and sustainable, and the unlicensed spectrum is relatively unstable and unsustainable. Currently, most WiFi (Wireless Fidelity) devices work on unlicensed spectrums. Unlicensed spectrums in China now include frequency bands such as 2.4 to 2.4835 GHz and 5.725 to 5.850 GHz. According to a spectrum white paper latest released by the Federal Communications Commission (FCC for short), unlicensed spectrum resources may be more than licensed spectrum resources. Therefore, if a Long Term Evolution (LTE) device is applied to an unlicensed spectrum, an unlicensed spectrum resource may be effectively used, thereby increasing a data transmission amount, and meeting ever-growing mobile broadband service requirements.

However, unlike the licensed spectrum, the unlicensed spectrum cannot be used stably for a long time. A situation in which the unlicensed spectrum is available in a period of time, but is unavailable in a next period of time may occur. For this situation, the originally available unlicensed spectrum becomes unavailable, but a data retransmission process is not ended, and continues waiting for a proper occasion on the unlicensed spectrum. As a result, obviously data cannot be sent in time, and packet loss may occur because of a timeout, thereby affecting timeliness and even stability of data transmission.

SUMMARY

Embodiments provide a data processing method, and a communications device and system. When a currently-used unlicensed spectrum resource is unavailable, retransmission can be triggered in time.

According to an aspect, the embodiments provide a communications device, including a sending unit 301 and a processing unit 307. The sending unit (301) is configured to transmit a data packet to a receiving node by using an unlicensed spectrum resource and by using a hybrid automatic repeat request (HARQ) process. The processing unit (307) is configured to: determine that the unlicensed spectrum resource used by the sending unit is unavailable, determine that an unsuccessfully-sent data packet exists in the HARQ process, and trigger automatic repeat request (ARQ) retransmission for the unsuccessfully-sent data packet.

In the communications device provided in the embodiments, the determining unit (3071) is further configured to determine that the unsuccessfully-sent data packet includes the RLC data of the AM mode or includes the important data. The control unit (3075) is configured to: after the determining unit determines that the unlicensed spectrum resource is unavailable and the unsuccessfully-sent data packet exists, and determines that the unsuccessfully-sent data packet includes the RLC data of the AM mode or includes the important data, trigger the ARQ retransmission for the unsuccessfully-sent data packet.

The communications device provided in the embodiments further includes: a first MAC layer execution unit (500), configured to execute the HARQ process by using the unlicensed spectrum resource; an RLC layer execution unit (505), configured to execute RLC retransmission; and a second MAC layer execution unit (507), configured to execute the HARQ process by using an available spectrum resource, where the processing unit (307) being configured to trigger the ARQ retransmission for the unsuccessfully-sent data packet includes: instructing the first MAC layer execution unit (500) to send, to the RLC layer execution unit, a first message used to trigger the RLC layer to execute the ARQ retransmission, where the first message includes first information, the first information is used to identify the first data packet, and the first data packet is the data packet that is unsuccessfully sent by the first MAC layer execution unit (500) by using the unlicensed spectrum resource; the RLC layer execution unit (505) retransmits the first data packet according to the first information included in the first message; and the second MAC layer execution unit (507) acquires the first data packet from the RLC layer execution unit, and sends the first data packet to the receiving node by using the sending unit (301).

According to another aspect, the embodiments provides a data processing method. The method includes transmitting, by a communications device, a data packet to a receiving node by using an unlicensed spectrum resource and by using an HARQ process. The method includes determining, by the communications device, that the unlicensed spectrum resource is unavailable and an unsuccessfully-sent data packet exists in the HARQ process. The method also includes triggering, by the communications device, ARQ retransmission for the unsuccessfully-sent data packet.

In the data processing method provided in the embodiments, before the triggering, by the communications device, ARQ retransmission for the unsuccessfully-sent data packet, the method further includes: determining that the unsuccessfully-sent data packet includes RLC data of an AM mode or includes important data.

In the data processing method provided in the embodiments, the communications device is user equipment; and after the determining, by the communications device, that the unlicensed spectrum resource is unavailable, the method further includes: generating the BSR; or further includes: after it is determined that a timer related to the BSR triggered to be generated is running, setting the timer to be timed out.

In the data processing method provided in the embodiments, before the generating the BSR, the method further includes determining that the unsuccessfully-sent data packet includes the BSR.

In the data processing method provided in the embodiments, the communications device is user equipment; and after the determining, by the communications device, that the unlicensed spectrum resource is unavailable, the method further includes: determining that an unsuccessfully-sent data packet includes a PHR, and generating the PHR, or the method further includes: after it is determined that a timer related to the PHR triggered to be generated is running, setting the timer to stop.

In the data processing method provided in the embodiments, the triggering, by the communications device, ARQ retransmission for the unsuccessfully-sent data packet includes: sending, by a MAC layer that uses the unlicensed spectrum resource in the communications device, to an RLC layer in the communications device, a first message used to trigger the RLC layer to execute the ARQ retransmission, where the first message includes first information, the first information is used to identify the first data packet, and the first data packet is the data packet that is unsuccessfully sent by the MAC layer by using the unlicensed spectrum resource; retransmitting, by the RLC layer, the first data packet according to the first information included in the first message; and acquiring, by a MAC layer that uses an available spectrum resource in the communications device, the first data packet from the RLC layer, and sending the first data packet to a peer device.

According to another aspect, the embodiments provide a communications system, including a base station and user equipment, where the foregoing communications device is used as the base station, and the foregoing communications device may be used as the user equipment.

In the embodiments, a corresponding solution is provided for a problem of data delay caused by the unavailability of the unlicensed spectrum resource, to ensure timeliness and stability of data.

A communications device transmits a data packet to a receiving node by using an unlicensed spectrum resource and by using an HARQ process. The communications device determines that the unlicensed spectrum resource is unavailable and an unsuccessfully-sent data packet exists in the HARQ process. The communications device triggers ARQ retransmission for the unsuccessfully-sent data packet.

According to another aspect, the embodiments provide a communications system, including a base station and user equipment, where the foregoing communications device is used as the base station, and the foregoing communications device may be used as the user equipment.

In the embodiments, a corresponding solution is provided for a problem of data delay caused by the unavailability of the unlicensed spectrum resource. After it is determined that the unlicensed spectrum resource used in an HARQ process is unavailable, and it is determined that the unsuccessfully-sent data packet exists in the HARQ process, automatic repeat request (ARQ) retransmission is triggered for the unsuccessfully-sent data packet, so that the communications device directly selects an available spectrum resource at the beginning of resource scheduling to perform transmission, thereby shortening a waiting time and ensuring timeliness and stability of data.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions may be applied to various communications systems, such as: a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), and a Universal Mobile Telecommunications System ("UMTS" for short).

It should also be understood that in the embodiments, a terminal device is also referred to as user equipment (UE for short), a terminal, a mobile station (MS for short), a mobile terminal, and the like. The terminal device may communicate with one or more core networks by using a radio access network (RAN for short). For example, the terminal device may be a mobile phone (also referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

In the embodiments, a base station may be a base station (Base Transceiver Station, "BTS" for short) in GSM or CDMA, or may be a base station (NodeB, "NB" for short) in WCDMA, or may be an evolved NodeB ("eNB or e-NodeB" for short) in LTE. The base station and the user equipment are not limited in the embodiments of the present invention.

Figure 1:
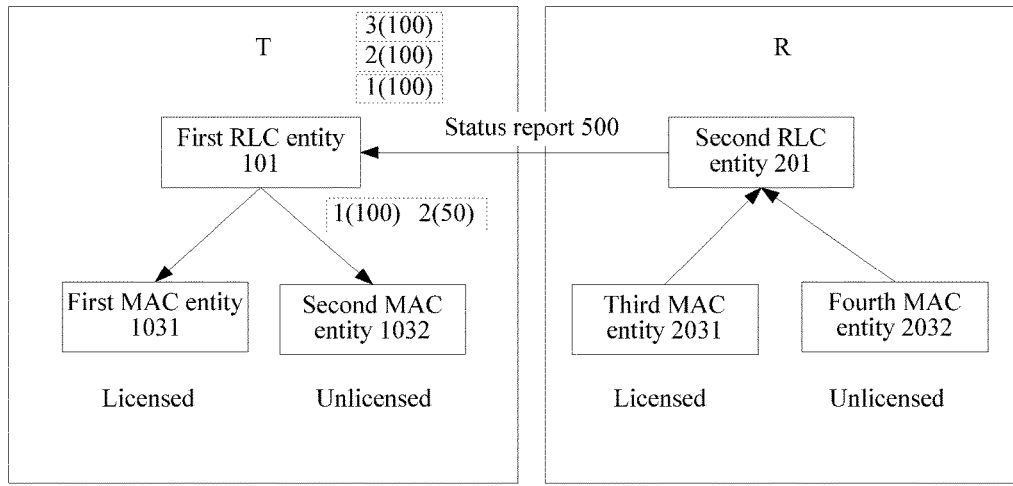
FIG. 1 is a schematic diagram of a data transmission process in the prior art.
Figure 2:
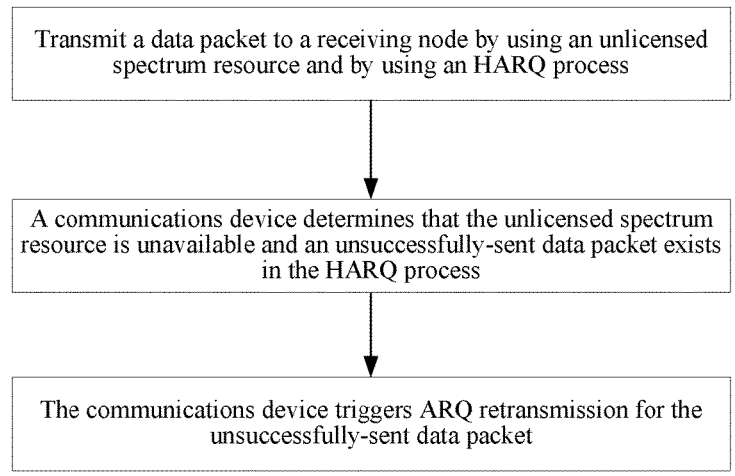
FIG. 2 is a schematic diagram of a data processing method according to an embodiment.
Figure 3:
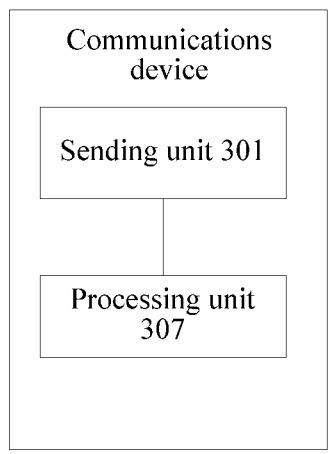
FIG. 3 is a schematic diagram of a communications device according to an embodiment.
Figure 4:
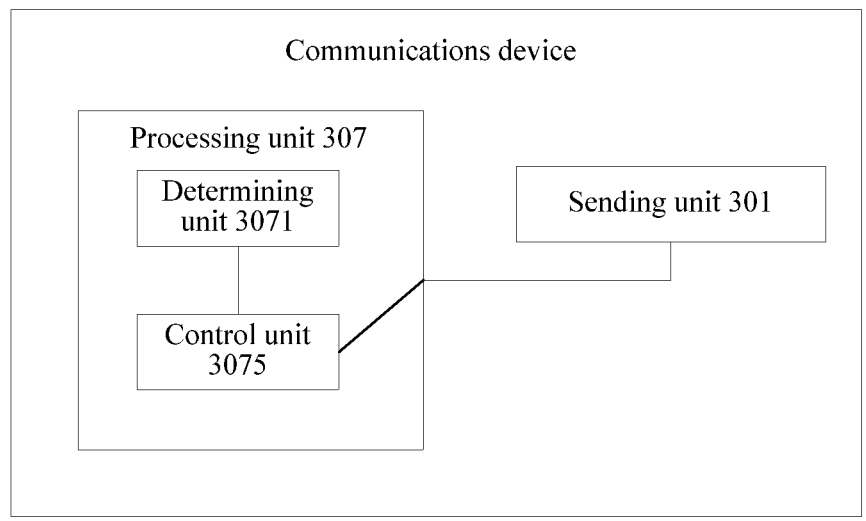
FIG. 4 is a schematic diagram of a communications device according to an embodiment.
Figure 5:
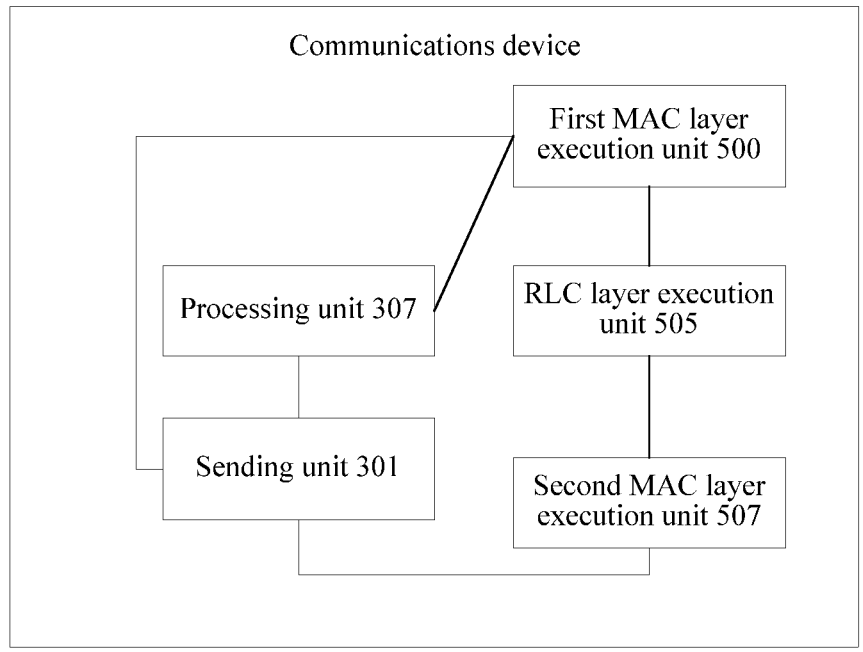
FIG. 5 is a schematic diagram of a communications device according to an embodiment.
Figure 6:
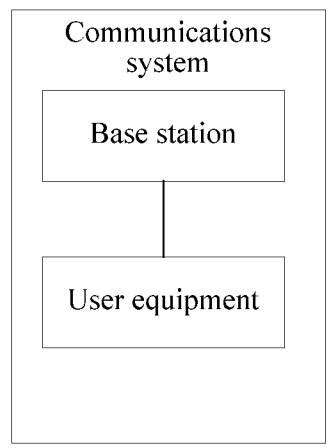
FIG. 6 is a schematic diagram of a communications system according to an embodiment.

FIG. 1 shows a transmitting node T and a receiving node R. Each node includes a radio link control (RLC) entity and a Media Access Control (MAC) entity. In the transmitting node T, a first RLC entity 101 is configured to bear a data service. Each RLC entity 101 may at least schedule a first MAC entity 1031 and a second MAC entity 1032. In the transmitting node T, the first MAC entity 1031 is configured to send a data packet in a licensed spectrum, and the second MAC entity 1032 is configured to send a data packet in an unlicensed spectrum. The data packets may include data or may include control information. The MAC entities in the transmitting node T send the data packets to MAC entities in the receiving node R by using an HARQ process. In the receiving node R, a third MAC entity 2031 is configured to receive the data packet in the licensed spectrum, and a fourth MAC entity 2032 is configured to receive the data packet in the unlicensed spectrum. The third and the fourth MAC entities send the received data packets to a second RLC entity 201 in the receiving node R. The second RLC entity 201 performs data processing on the received data packet, to restore raw data.

In an actual environment, because of deterioration of a channel condition or another reason, some data packets are lost in a process in which the receiving node receives a data packet. In this case, the receiving node needs to instruct the transmitting node to resend the data. The process of data retransmission is represented as the HARQ process at a MAC layer, and is represented as an ARQ process at an RLC layer. The ARQ process includes initial transmission and ARQ retransmission. The HARQ process and the ARQ process are two independent retransmission processes. The HARQ process and the ARQ process are both automatic retransmission processes, and have respective maximum quantities of retransmission times.

In the HARQ process, after a data packet in the transmitting node is sent, the receiving node feeds back whether the data packet is correctly decoded to the transmitting node, that is, sends an acknowledgement (Acknowledgement, ACK) or a negative acknowledgement (Negative Acknowledgement, NACK) to the transmitting node. If the feedback is a NACK, the transmitting node retransmits the data. The maximum quantity of retransmission times for which retransmission may be performed is preset, for example, five times. If the data is still not successfully sent when the maximum quantity of retransmission times is reached, an HARQ entity in the transmitting node stops sending the data packet at the MAC layer.

The ARQ process of the RLC layer is as follows: After the transmitting node transfers the data packet from the RLC layer to the MAC layer, a timer is started. When the timer is timed out and the transmitting node has not received a status report that is from the receiving node and that indicates that the data packet is successfully sent, data of the RLC layer is triggered to be retransmitted. Initiating of resending performed by the RLC layer each time is referred to as triggering of the ARQ retransmission. There are three modes of data transmission of the RLC layer, which are an acknowledged mode (AM mode), a transparent mode (TM Mode) and an unacknowledged mode (UM Mode). The foregoing sent data packet may be a data packet including data of the AM mode.

An RLC entity and a MAC entity in a same node are collaborative. A corresponding ARQ process and HARQ process are associated. Use the transmitting node T shown in FIG. 1 as an example. There are data packets 1, 2, and 3 that are to be sent in a buffer. It is assumed that each data packet has 100 bytes. When the second MAC entity 1032 notifies the first RLC entity 101 that 150 bytes may be sent in an unlicensed spectrum, the RLC entity 101 sends 100 bytes of the data packet 1 and the first 50 bytes of the data packet 2 to the second MAC entity 1032. The last 50 bytes of the data packet 2 wait for a next available sending occasion. The second MAC entity 1032 receives the data packets of 150 bytes, starts the HARQ process, and sends the data packets to the fourth MAC entity 2032 in the receiving node R. When the second RLC entity 201 restores the data packets, a case in which a data packet is lost may occur. For example, only the data packets 2 and 3 of the original data packets 1, 2, and 3 are restored, that is, the data packet 1 is lost. The second RLC entity 201 triggers the ARQ retransmission by sending a status report 500 to the first RLC entity 101, so as to instruct the first RLC entity 101 to resent the data packet 1. In addition, when the HARQ of the MAC layer in the transmitting node exceeds the maximum quantity of retransmission times, the ARQ retransmission may be triggered inside the transmitting node. Specifically, the MAC layer in the transmitting node notifies the RLC layer of the transmitting node that the data packet 1 is not successfully sent.

In an actual process, the data packets do not arrive in sequence. Therefore, whether packet loss exists may be determined only after the RLC layer obtains all data packets. For the situation in FIG. 1, even if the first 50 bytes of the data packet 2 already arrive at the RLC entity of the receiving node, whether the data packet 2 is lost still cannot be determined. Whether the data packet 2 is lost can be determined only after the last 50 bytes of the data packet 2 are correctly received. As a result, a longer time needs to be set for the timer in the ARQ retransmission, so as to wait for all data that should be received. Therefore, compared with a retransmission response of the HARQ process, the RLC entity includes more data transmission processes and a longer waiting time.

In addition, in the situation in FIG. 1, it is assumed that both the data packet 1 and the data packet 2 are lost, but the second RLC entity 201 cannot know. The second RLC entity 201 can know that the data packets 1 and 2 are both already lost only by waiting for a longer time and after receiving the data packet 3, and then the retransmission process is triggered. If more packets are continuously lost, a waiting time is longer.

In addition, only after all to-be-sent data, that is, the data packet 1 to the data packet 3, is sent, the transmitting node requests the receiving node to perform determining, and the ARQ retransmission may be triggered. For example, after the data packets 1, 2, and 3 are sent, the receiving node finds that the data packet 3 is lost, and then triggers the retransmission. Obviously, such waiting is longer.

Obviously, in the foregoing technical solution, an unnecessary waiting time exists, thereby prolonging the retransmission process of the data transmission and affecting timeliness of the data transmission.

Because of instability of the unlicensed spectrum, a case of unavailability often occurs. In a case in which a data packet is transmitted by using the unlicensed spectrum, whenever the unlicensed spectrum is unavailable, the foregoing HARQ and/or ARQ retransmission is triggered. Therefore, a delay situation in the data transmission is further aggravated. Needed data cannot be transmitted in time, which even affects effectiveness of the data transmission.

There are many cases in which the unlicensed spectrum becomes unavailable from available in the data packet transmission process. An example is used below for description. When a service period appointed by a communications device always using the unlicensed spectrum and a peer device expires, the communications device no longer has a right to use the unlicensed spectrum, and for the communications device, the unlicensed spectrum is unavailable. In short, as long as the communications device cannot use an unlicensed spectrum, it indicates that the unlicensed spectrum is unavailable for the communications device.

A corresponding solution is provided in the following embodiments for a problem of data transmission delay caused by the unavailability of the unlicensed spectrum.

Embodiment 1

The following further provides a communications device according to an embodiment.

A communications device is provided according to this embodiment, where the communications device may be user equipment, or may be a network device on a network side such as a base station.

The communications device may include a sending unit 301 and a processing unit 307, where the sending unit 301 is configured to transmit a data packet to a receiving node by using an unlicensed spectrum resource and by using an HARQ process. The processing unit 307 is configured to: determine that the unlicensed spectrum resource used by the sending unit is unavailable, determine that an unsuccessfully-sent data packet exists in the HARQ process, and trigger ARQ retransmission for the unsuccessfully-sent data packet.

In this embodiment, when an unlicensed spectrum is unavailable, the communications device actively triggers the ARQ retransmission. In doing so, there are the following advantages: the communications device does not anymore passively wait for an acknowledgement message or a status report sent by the receiving node. The communications device changes from passive to active, thereby avoiding a waiting time before the receiving node sends the acknowledgement message, and the communications device does not need to trigger the ARQ retransmission of an RLC layer by using the HARQ process of a MAC layer of the communications device either. Instead, the communications device directly selects an available spectrum resource at the beginning of resource scheduling to perform transmission, thereby shortening a waiting time.

According to the communications device of this embodiment, before triggering the ARQ retransmission for the unsuccessfully-sent data packet, the processing unit 307 may further determine that the unsuccessfully-sent data packet includes RLC data of an AM mode or includes important data.

According to the communications device of this embodiment, the sending unit 301 transmits a first data packet to the receiving node by using a licensed spectrum resource, where the first data packet includes the important data, where the important data is preset, or is configured and notified to the communications device by a network side device.

According to this embodiment, the important data may include at least one type of the following data: a timing advance command (TAC), a secondary cell activation command (SCell active command), a secondary cell deactivation command (SCell deactive command), a continuous reception (Discontinuous Reception, DRX) MAC vacancy unit, a buffer status report (BSR), a power headroom report (PHR), an RLC status report (RLC status report), a UE contention resolution identity (UE Contention Resolution Identity), or an RRC message (RRC message).

According to the communications device of this embodiment, the processing unit 307 may include a determining unit 3071 and a control unit 3075. The determining unit 3071 is configured to: determine the unlicensed spectrum resource used by the sending unit is unavailable, and determine that the unsuccessfully-sent data packet exists in the HARQ process. The control unit 3075 is configured to: after the determining unit determines that the unlicensed spectrum resource is unavailable and the unsuccessfully-sent data packet exists, trigger the ARQ retransmission for the unsuccessfully-sent data packet.

According to the communications device of this embodiment, the determining unit 3071 is further configured to determine that the unsuccessfully-sent data packet includes the RLC data of the AM mode or includes the important data. The control unit 3075 is configured to: after the determining unit determines that the unlicensed spectrum resource is unavailable and the unsuccessfully-sent data packet exists, and determines that the unsuccessfully-sent data packet includes the RLC data of the AM mode or includes the important data, trigger the ARQ retransmission for the unsuccessfully-sent data packet.

A beneficial effect of determining a type of data in the data packet and determining, according to the type of the data, to trigger the ARQ retransmission is that when the important data is detected, the actively-triggered ARQ transmission process strengthens a timely response to the important data, thereby further enhancing timeliness and stability of data transmission.

According to the communications device of this embodiment, when the communications device is user equipment UE. The control unit 3075 is further configured to generate the BSR; or is further configured to: after it is determined that a timer related to the BSR triggered to be generated is running, set the timer to be timed out.

According to the communications device of this embodiment, when the communications device is user equipment UE, the control unit 3075 is further configured to: after the determining unit 3071 determines that the unsuccessfully-sent data packet includes the BSR, generate a BSR; or is further configured to: after the determining unit 3071 determines that the unsuccessfully-sent data packet includes the BSR, and determines that a timer related to the BSR triggered to be generated is running, set the timer to be timed out.

According to the communications device of this embodiment, when the communications device is user equipment UE, the control unit 3075 is further configured to: after the determining unit 3071 determines that the unsuccessfully-sent data packet includes the PHR, generate a PHR; or the control unit 3075 is further configured to: after the determining unit 3071 determines that a timer related to the PHR triggered to be generated is running, set the timer to stop.

By means of the foregoing processing solution for the BSR and the PHR, a case in which BSR data and PHR data cannot be retransmitted because the BSR data and the PHR data are cancelled after the BSR data and the PHR data are sent by a MAC PDU can be effectively avoided, thereby reducing a probability of BSR and PHR loss and improving stability of a system. In addition, a condition may be created, by using the foregoing setting for the timer, for triggering the BSR and the PHR, thereby further ensuring timeliness and effectiveness of the data transmission.

According to the communications device of this embodiment, the communications device may further include: a first MAC layer execution unit 500, configured to execute the HARQ process by using the unlicensed spectrum resource; an RLC layer execution unit 505, configured to execute RLC retransmission. The device may also include a second MAC layer execution unit 507, configured to execute the HARQ process by using an available spectrum resource. The processing unit 307 being configured to trigger the ARQ retransmission for the unsuccessfully-sent data packet includes: instructing the first MAC layer execution unit 500 to send, to the RLC layer execution unit, a first message used to trigger the RLC layer to execute the ARQ retransmission, where the first message includes first information, the first information is used to identify the first data packet, and the first data packet is the data packet that is unsuccessfully sent by the first MAC layer execution unit 500 by using the unlicensed spectrum resource. The RLC layer execution unit 505 retransmits the first data packet according to the first information included in the first message. The second MAC layer execution unit 507 acquires the first data packet from the RLC layer execution unit, and sends the first data packet to the receiving node by using the sending unit 301.

According to the communications device of this embodiment, the determining, by the processing unit 307, that the unlicensed spectrum resource is unavailable may include any one of the following: detecting, by the processing unit 307, that the unlicensed spectrum resource is occupied by another device, and determining that the unlicensed spectrum resource is unavailable; detecting, by the processing unit 307, that an available time of the unlicensed spectrum resource is timed out, and determining that the unlicensed spectrum resource is unavailable; or receiving, by the processing unit 307, a message sent by a network node and indicating that the unlicensed spectrum resource is unavailable, and determining, according to the message, that the unlicensed spectrum resource is unavailable.

According to the communications device of this embodiment, the sending unit 301 sends the important data only in a licensed spectrum.

Successful sending of the important data may be ensured better by sending the important data only in the licensed spectrum.

Embodiment 2

According to an embodiment, a data processing method is provided. The method includes transmitting, by a communications device, a data packet to a receiving node by using an unlicensed spectrum resource and by using an HARQ process. The method also includes determining, by the communications device, that the unlicensed spectrum resource is unavailable and an unsuccessfully-sent data packet exists in the HARQ process. The method also includes triggering, by the communications device, ARQ retransmission for the unsuccessfully-sent data packet.

In a data packet transmission process, a data packet may be divided into important data and ordinary data according to importance of data. Optionally, the important data is preset. For example, it is stipulated that some data is the important data in a preset protocol. Optionally, the important data may be configured and notified to the communications device by a network side device. For example, a base station device stipulates that some data is the important data, and notifies user equipment UE.

It can be understood that the important data includes but is not limited to control signaling of RRC, RLC, and MAC layers, which is exemplified as follows: a timing advance command (TAC), a secondary cell activation command (SCell active command), a secondary cell deactivation command (SCell deactive command), a continuous reception (Discontinuous Reception, DRX) MAC vacancy unit, a buffer status report (BSR), a power headroom report (PHR), an RLC status report (RLC status report), a UE contention resolution identity, or an RRC message.

The triggering, by the communications device, ARQ retransmission for the unsuccessfully-sent data packet includes: sending, by a MAC layer that uses the unlicensed spectrum resource in the communications device, to an RLC layer in the communications device, a first message used to trigger the RLC layer to execute the ARQ retransmission, where the first message includes first information, the first information is used to identify the first data packet, and the first data packet is the data packet that is unsuccessfully sent by the MAC layer by using the unlicensed spectrum resource; retransmitting, by the RLC layer, the first data packet according to the first information included in the first message; and acquiring, by a MAC layer that uses an available spectrum resource in the communications device, the first data packet from the RLC layer, and sending the first data packet to a peer device.

According to this embodiment, a manner of the determining, by the communications device, that the unlicensed spectrum resource is unavailable may include any one of the following: detecting, by the communications device, that the unlicensed spectrum resource is occupied by another device, and determining that the unlicensed spectrum resource is unavailable, for example, the communications device finds that another interference source already exists in a corresponding frequency band; or when determining, by detection, that an RSSI signal strength of the unlicensed spectrum resource exceeds a preset threshold, the communications device determines that the unlicensed spectrum resource is unavailable; detecting, by the communications device, that an available time of the unlicensed spectrum resource is timed out, and determining that the unlicensed spectrum resource is unavailable; or receiving, by the communications device, a message sent by a network node and indicating that the unlicensed spectrum resource is unavailable, and determining, according to the message, that the unlicensed spectrum resource is unavailable, for example, when receiving a request to send (RTS) or a clear to send (CTS), determining that the unlicensed spectrum resource is unavailable.

At a moment when the unlicensed spectrum is unavailable, a transmitting node, that is, the foregoing communications device, actively triggers the ARQ retransmission. In doing so, there are the following advantages: the transmitting node does not anymore passively wait for an acknowledgement message or a status report sent by the receiving node. The transmitting node changes from passive to active, thereby avoiding a waiting time before the receiving node sends the acknowledgement message, and the transmitting node does not need to trigger the ARQ retransmission of an RLC layer by using the HARQ process of a MAC layer of the transmitting node either. Instead, the transmitting node directly selects an available spectrum resource at the beginning of resource scheduling to perform transmission, thereby shortening a waiting time.

Embodiment 3

For an AM mode of data sending modes of an RLC layer, a transmitting node performs transmission after a necessary control protocol overhead is added to high-layer data, and ensures to transfer the high-layer data to a communication peer. The AM mode is a standard mode for packet data transmission, for example, email downloading.

To strengthen effectiveness of data, compared with Embodiment 2, this embodiment strengthens protection on important data. A part, which is the same as that of Embodiment 2, of this embodiment is not described again.

According to this embodiment, before the triggering, by the communications device, ARQ retransmission for the unsuccessfully-sent data packet, the method further includes: determining that the to-be-sent data packet includes the RLC data of the AM mode or includes the important data.

According to the foregoing embodiment, a beneficial effect is that when the important data is detected, the actively-triggered ARQ transmission process strengthens a timely response to the important data, thereby further enhancing timeliness and stability of data transmission.

Embodiment 4

According to this embodiment, timeliness and stability in uplink transmission are enhanced. A communications device in this embodiment may be user equipment (UE).

In a process of sending data of a MAC layer, another part of data sent by the MAC layer is generated by the MAC layer, for example, a buffer status report (BSR) and a power headroom report (PHR). The BSR is a status report used by the user equipment to report a data situation in a buffer of the current UE to a base station (Evolved NodeB, eNB), and the eNB schedules the UE according to the BSR. The PHR is used to provide, to the serving eNB, information about a difference between a maximum transmit power of the UE and an estimated value of a transmit power of a current uplink shared channel (UL-SCH).

For the BSR, when a generated BSR is ready to be sent by a protocol data unit (PDU) forming the MAC layer, the BSR is cancelled. Therefore, if an HARQ process of the MAC PDU including the BSR does not succeed eventually, the BSR cannot be retransmitted either. Based on a same reason, there is also a situation in which the PHR cannot be retransmitted again. Obviously, a higher failure probability of the HARQ process indicates a higher probability that the BSR and the PHR are lost. Such signaling loss causes a system to be unstable.

The following specifically describes a technical solution about the BSR. This solution is basically the same as that in Embodiment 2. A main difference is: after the communications device determines that an unlicensed spectrum resource is unavailable, this solution further includes: generating the BSR, and if it is determined that an unsuccessfully-sent data packet includes the BSR, generating the BSR again.

A manner for generating the BSR includes but is not limited to the following manners: triggering by a clock, triggering by a specific channel buffer status, or triggering by filling. In an alternative solution for generating the BSR, there may further be the following technical solution: after determining that the unlicensed spectrum resource is unavailable, determining, by the communications device, that a timer related to the BSR is running, and then setting the timer to be timed out. Specifically, the timer related to the BSR includes but is not limited to a retransmission BSR timer (retxBSR-Timer), and a periodic BSR timer (periodicBSR-Timer).

A condition for triggering the BSR may be that the foregoing timer is timed out. Therefore, a condition for triggering the BSR may be created by setting the foregoing timer to be timed out. A data buffer situation of the UE may be reported to the base station in time, so that the base station performs resource scheduling in time, thereby shortening a data sending delay.

The following specifically describes a technical solution about the PHR. This solution is basically the same as that in Embodiment 2. A main difference is as follows.

After the determining, by the communications device, that the unlicensed spectrum resource is unavailable, this solution further includes: generating the PHR; or further includes: after it is determined that a timer related to the PHR is running, setting the timer to stop. Specifically, a process of triggering the PHR may be generating the PHR at an RRC layer. The timer related to the PHR includes but is not limited to a periodic PHR timer (periodicPHR-Timer). The PHR is triggered to be regenerated by stopping the periodicPHR-Timer.

The condition for triggering the PHR may be the foregoing two forms. Therefore, by means of the foregoing process, a case in which PHR data cannot be retransmitted because the PHR data is cancelled after the PHR data is sent by a MAC PDU can be effectively avoided, thereby reducing a probability of PHR loss and improving stability of a system. In addition, a condition may be created, by using the foregoing setting for the timer, for triggering the PHR, thereby further ensuring timeliness and effectiveness of data transmission.

Embodiment 5

According to this embodiment, a communications device transmits a data packet to a receiving node by using an unlicensed spectrum resource and by using an HARQ process. The communications device determines that the unlicensed spectrum resource is unavailable and an unsuccessfully-sent data packet exists in the HARQ process. The unsuccessfully-sent data packet is moved from an HARQ buffer of the unlicensed spectrum resource to a vacant HARQ buffer of a licensed spectrum resource.

Correspondingly, the communications device may include a sending unit, a processing unit, and an HARQ buffer, where the HARQ buffer is configured to buffer a to-be-sent data packet, and the HARQ buffer includes an HARQ buffer of the unlicensed spectrum resource and an HARQ buffer of a licensed spectrum resource; the sending unit is configured to transmit a data packet to a receiving node by using an unlicensed spectrum resource and by using an HARQ process; and the processing unit is configured to: determine that the unlicensed spectrum resource is unavailable and an unsuccessfully-sent data packet exists in the HARQ process, and move the unsuccessfully-sent data packet from the HARQ buffer of the unlicensed spectrum resource to a vacant HARQ buffer of the licensed spectrum resource.

Optionally, the unsuccessfully-sent data packet is stored in a first buffer in a first MAC layer execution unit. The so-called movement refers to copying data over without performing processing on the data. If data is stored in an original buffer, the data in the original buffer is deleted. The sending unit sends the unsuccessfully-sent data packet obtained after the movement to the receiving node by using the HARQ process.

The MAC layer sends data by using an HARQ entity in the MAC layer. The HARQ entity totally has eight processes, and each process corresponds to one HARQ buffer. A vacant buffer is searched for in the HARQ buffer of a MAC entity corresponding to a selected spectrum resource. A search process may be a process that cycles until the vacant buffer is found. It should be noted that moving the data to the HARQ buffer of the licensed spectrum does not affect work of an RLC layer. The RLC layer maintains a normal data transmission process of the RLC layer.

In this embodiment, an unsuccessfully-sent data packet is moved from an HARQ buffer of an unlicensed spectrum resource to a vacant HARQ buffer of a licensed spectrum resource. Data in the buffer does not need to be processed, thereby reducing a repetitive and unnecessary processing process, so that low-layer data does not need to experience a high-layer processing process again, thereby further shortening a waiting time and enhancing timeliness of data transmission. Timely transmission of data may prevent a possible data interrupt situation from occurring, thereby enhancing effectiveness of data transmission.

Embodiment 6

A difference between this embodiment and Embodiment 2 is that important data is not sent on an unlicensed spectrum resource, but sent only on a licensed spectrum resource.

A data packet may be divided into important data and ordinary data according to importance of data. Optionally, the important data is preset. For example, it is stipulated that some data is the important data in a preset protocol. Optionally, the important data may be configured and notified to the communications device by a network side device. For example, a base station device stipulates that some data is the important data, and notifies user equipment UE.

It can be understood that the important data includes but is not limited to control signaling of RRC, RLC, and MAC layers, which is exemplified as follows: a timing advance command (TAC), a secondary cell activation command (SCell active command), a secondary cell deactivation command (SCell deactive command), a continuous reception (Discontinuous Reception, DRX) MAC vacancy unit, a buffer status report (BSR), a power headroom report (PHR), an RLC status report (RLC status report), a UE contention resolution identity, or an RRC message.

According to this embodiment, the important data is sent only on a licensed spectrum resource, so as to completely avoid a problem of instability of the unlicensed spectrum resource, thereby ensuring timeliness and stability of data transmission.

Embodiment 7

The following further provides a communications system according to an embodiment.

The communications system includes a base station and user equipment. It can be understood that the communications device in any one of the foregoing embodiments may be used as the base station. Similarly, the communications device in any one of the foregoing embodiments may be used as the user equipment. As long as at least one of the base station or the user equipment uses the method, it should fall within the scope of the present invention.

A person of ordinary skill in the art may be aware that, in combination with the examples described in the embodiments disclosed in this specification, units and functional steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of combining a software functional unit and hardware.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In summary, what is described above is merely exemplary embodiments of the technical solutions of the present invention, but is not intended to limit the protection scope of the present invention. Any modification, equivalent replacement, or improvement made without departing from the principle of the present invention shall fall within the protection scope of the present invention.

What is claimed is:

1. A device, comprising:
   a transmitter, configured to transmit a first data packet to a receiving node using an unlicensed spectrum resource and using a hybrid automatic repeat request (HARQ) process; and
   a processor, configured to:
      determine the unlicensed spectrum resource used by the transmitter is unavailable;
      determine that the first data packet that was transmitted by the transmitter is unsuccessfully-sent and exists in the HARQ process; and
      in response to determining that the unlicensed spectrum resource used by the transmitter is unavailable, and in response to determining that the first data packet that was transmitted by the transmitter is unsuccessfully-sent and exists in the HARQ process, trigger automatic repeat request (ARQ) retransmission for the unsuccessfully-sent first data packet, wherein the unsuccessfully-sent first data packet comprises radio link control (RLC) data of an acknowledged mode (AM mode) or comprises first data having a preset type.

2. The device according to claim 1, wherein before triggering the ARQ retransmission for the unsuccessfully-sent first data packet, the processor is further configured to determine the unsuccessfully-sent first data packet comprises the RLC data of the acknowledged mode (AM) or comprises the first data having the preset type.

3. The device according to claim 2, wherein the first data having the preset type comprises at least one type of the following data:
   a timing advance command (TAC), a secondary cell activation command (SCell active command), a secondary cell deactivation command (SCell deactive command), a buffer status report (BSR), a power headroom report (PHR), an RLC status report, a user equipment contention resolution identity, or a radio resource control message (RRC message).

4. The device according to claim 1, wherein the transmitter is further configured to transmit a second data packet to the receiving node by using a licensed spectrum resource, wherein the second data packet comprises the first data having the preset type, and wherein the first data having the preset type is preset, or is configured and notified to the device by a network side device.

5. The device according to claim 1, wherein the device is a user equipment; and
   wherein the processor is further configured to:
   generate a buffer status report (BSR); or
   after determining a timer related to the generated BSR is running, set the timer to be timed out.

6. The device according to claim 1, wherein the device is a user equipment; and
   wherein the processor is further configured to:
   generate a buffer status report (BSR) after determining the unsuccessfully-sent first data packet comprises the BSR; or
   set a timer to be timed out after determining the unsuccessfully-sent first data packet comprises the BSR, and the timer related to the BSR triggered to be generated is running.

7. The device according to claim 1, wherein the device is a user equipment; and
   wherein the processor is further configured to:
   generate a power headroom report (PHR) after determining the unsuccessfully-sent first data packet comprises the PHR; or
   set a timer to stop, after determining the timer related to the PHR triggered to be generated is running.

8. The device according to claim 1, further comprising:
   a first media access control (MAC) layer entity, configured to execute, by using the transmitter, the HARQ process using the unlicensed spectrum resource;
   an RLC layer entity, configured to execute RLC retransmission; and
   a second MAC layer entity, configured to execute the HARQ process by using an available spectrum resource;
   wherein the processor being configured to trigger the ARQ retransmission for the unsuccessfully-sent first data packet comprises: instructing the first MAC layer entity to send, to the RLC layer entity, a first message used to trigger the RLC layer entity to execute the ARQ retransmission, wherein the first message comprises first information, the first information identifies the first data packet, and the first data packet is unsuccessfully sent by the first MAC layer entity by using the unlicensed spectrum resource;
   wherein the RLC layer entity is configured to retransmit the first data packet according to the first information comprised in the first message; and
   wherein the second MAC layer entity is configured to acquire the first data packet from the RLC layer entity, and send the first data packet to the receiving node by using the transmitter.

9. The device according to claim 1, wherein determining, by the processor, the unlicensed spectrum resource is unavailable comprises:
   detecting, by the processor, the unlicensed spectrum resource is occupied by another device, and determining the unlicensed spectrum resource is unavailable;
   detecting, by the processor, an available time of the unlicensed spectrum resource is timed out, and determining the unlicensed spectrum resource is unavailable; or
   receiving, by the processor, a message sent by a network node that indicates the unlicensed spectrum resource is unavailable, and determining, according to the message, the unlicensed spectrum resource is unavailable.

10. A system, comprising:
    a base station; and
    user equipment;
    wherein the base station is the device according to claim 1, the user equipment is the device according to claim 1, or both the base station and the user equipment are devices according to claim 1.

11. A method, comprising:
    generating a buffer status report (BSR);
    transmitting, by a user equipment (UE), a first data packet to a receiving node by using an unlicensed spectrum resource and by using a hybrid automatic repeat request (HARQ) process;
    determining, by the UE, the unlicensed spectrum resource is unavailable and the first data packet that was transmitted by the UE is unsuccessfully-sent and exists in the HARQ process;
    in response to determining that the unlicensed spectrum resource is unavailable, and the first data packet that was transmitted is unsuccessfully-sent and exists in the HARQ process, triggering, by the UE, automatic repeat request (ARQ) retransmission for the unsuccessfully-sent first data packet: and
    after determining that the unlicensed spectrum resource is unavailable:
    determining that the unsuccessfully-sent first data packet comprises the BSR; and
    regenerating the BSR, or setting a timer related to the BSR to be timed out.

12. The method according to claim 11, wherein before triggering the ARQ retransmission for the unsuccessfully-sent first data packet, the method further comprises:
    determining the unsuccessfully-sent first data packet comprises radio link control (RLC) data of an acknowledged mode (AM mode) or comprises first data having a preset type.

13. The method according to claim 12, wherein the first data having the preset type comprises at least one type of the following data:
    a timing advance command (TAC), a secondary cell activation command (SCell active command), a secondary cell deactivation command (SCell deactive command), the BSR, a power headroom report (PHR), an RLC status report, a user equipment contention resolution identity, or a radio resource control message (RRC message).

14. The method according to claim 11, further comprising:
    transmitting, by the UE, a second data packet to the receiving node using a licensed spectrum resource, wherein the second data packet comprises first data having a preset type, wherein the first data is preset, or is configured and notified to the UE by a network side device.

15. A device, comprising:
    a transmitter; and
    a processor;
    wherein the processor is configured to implement a first media access control (MAC) layer entity, and the first MAC layer entity is configured to execute, using the transmitter, a hybrid automatic repeat request (HARQ) process using an unlicensed spectrum resource;

wherein the processor is configured to implement a radio link control (RLC) layer entity, and the RLC entity is configured to execute RLC retransmission;

wherein the processor is configured to implement a second MAC layer entity, and the second MAC layer entity is configured to execute the HARQ process using an available spectrum resource;

wherein the processor is configured to cause the first MAC layer entity to send, using the transmitter, a first data packet to a receiving node using the unlicensed spectrum resource and using the HARQ process;

wherein the processor is configured to determine the unlicensed spectrum resource is unavailable;

wherein the processor is configured to determine that the first data packet that was transmitted by the transmitter is unsuccessfully-sent and exists in the HARQ process; and wherein the processor is configured to, in response to determining that the unlicensed spectrum resource used by the transmitter is unavailable, and the first data packet is unsuccessfully-sent and exists in the HARQ process, instruct the first MAC layer entity to send, to the RLC layer entity, a first message used to trigger the RLC layer entity to execute automatic repeat request (ARQ) retransmission, wherein the first message comprises first information, the first information identifies the first data packet, and the first data packet is unsuccessfully sent by the first MAC layer entity using the unlicensed spectrum resource;

wherein the processor is configured to cause the RLC layer entity to retransmit the first data packet according to the first information comprised in the first message; and wherein the processor is configured to cause the second MAC layer entity to acquire the first data packet from the RLC layer entity, and send the first data packet to the receiving node using the transmitter.

16. The device according to claim 15, wherein the unsuccessfully-sent first data packet comprises RLC data of an acknowledged mode (AM) or comprises first data having a preset type.

17. The device according to claim 16, wherein the first data having the preset type comprises at least one type of the following data:

a timing advance command (TAC), a secondary cell activation command (SCell active command), a secondary cell deactivation command (SCell deactive command), a buffer status report (BSR), a power headroom report (PHR), an RLC status report, a user equipment contention resolution identity, or a radio resource control message (RRC message).

* * * * *